United States Patent

Agrawal et al.

[11] Patent Number: 5,255,524
[45] Date of Patent: Oct. 26, 1993

[54] DUAL HEAT PUMP CYCLES FOR INCREASED ARGON RECOVERY

[75] Inventors: Rakesh Agrawal, Allentown; Terrence F. Yee, Macungie, both of Pa.

[73] Assignee: Air Products & Chemicals, Inc., Allentown, Pa.

[21] Appl. No.: 835,640

[22] Filed: Feb. 13, 1992

[51] Int. Cl.$^5$ .................................................. F25J 3/04
[52] U.S. Cl. ..................................... 62/22; 60/39.12; 62/24; 62/40
[58] Field of Search ........................ 62/22, 24, 40; 60/39.12

[56] References Cited

U.S. PATENT DOCUMENTS

| | | | |
|---|---|---|---|
| 4,575,388 | 3/1986 | Okada | 62/22 |
| 4,615,716 | 10/1986 | Cormier et al. | 62/24 |
| 4,670,031 | 6/1987 | Erickson | 62/22 |
| 4,783,208 | 11/1988 | Rathbone | 62/22 |
| 4,790,866 | 12/1988 | Rathbone | 62/22 |
| 4,822,385 | 4/1989 | Cheung | 62/22 |
| 4,832,719 | 5/1989 | Erickson | 62/22 |
| 4,932,212 | 6/1990 | Rohde | 62/22 |
| 5,069,699 | 12/1991 | Agrawal | 62/39 |
| 5,081,845 | 1/1992 | Allam et al. | 60/39.12 |

OTHER PUBLICATIONS

R. E. Latimer, Distillation of Air, Feb. 1969, 35-59.

Primary Examiner—Ronald C. Capossela
Attorney, Agent, or Firm—Robert J. Wolff; James C. Simmons; William F. Marsh

[57] ABSTRACT

The present invention relates to an improvement for the production of argon from cryogenic air separation processes. In particular, the improvement comprises using a first heat pump cycle to transfer refrigeration from the bottom of the low pressure column to the top of the crude argon column and a second heat pump cycle to transfer refrigeration from the bottom of the low pressure column to the top of the low pressure column.

14 Claims, 9 Drawing Sheets

DUAL HEAT PUMP CYCLES FOR INCREASED ARGON RECOVERY

FIELD OF THE INVENTION

The present invention is related to a process for the cryogenic distillation of air using a multiple column distillation system to produce argon, in addition to nitrogen and/or oxygen.

BACKGROUND OF THE INVENTION

Argon is a highly inert element over a very wide range of conditions, both at cryogenic and very high temperatures. It is used in steel-making, light bulbs, electronics, welding and gas chromatography. The major source of argon is that found in the air and it is typically produced therefrom using cryogenic air separation units. The world demand for argon is increasing and thus it is essential to develop an efficient process which can produce argon at high recoveries using cryogenic air separation units.

Historically, the typical cryogenic air separation unit used a double distillation column with a crude argon (or argon side arm) column to recover argon from air. A good example of this typical unit is disclosed in an article by Latimer, R. E., entitled "Distillation of Air", in Chemical Engineering Progress, 63 (2), 35–59 [1967]. A conventional unit of this type is shown in FIG. 1, which is discussed later in this disclosure.

However, this conventional process has some shortcomings. U.S. Pat. No. 4,670,031 discusses in detail these shortcomings and explains the problems which limit the amount of crude argon recovery with the above configuration. This can be easily explained with reference to FIG. 1. For a given production of oxygen and nitrogen products, the total boilup and hence the vapor flow in the bottom of section I of the low pressure column is nearly fixed. As this vapor travels up the low pressure column it is split between the feed to the crude argon column and the feed to the bottom of section II of the low pressure column. The gaseous feed to the top of section II of the low pressure column is derived by the near total vaporization of a portion of the crude liquid oxygen stream in the boiler/condenser located at the top of the crude argon column. The composition of this gaseous feed stream is typically 35-40% oxygen. A minimum amount of vapor is needed in section II of the low pressure column, namely the amount necessary for it to reach the introduction point of the gaseous feed to the top of section II without pinching in this section. Since the composition of the gaseous feed stream to the top of section II is essentially fixed, the maximum flow of vapor which can be sent to the crude argon column is also limited. This limits the argon which can be recovered from this process.

In order to increase argon recovery, it is desirable to increase the flow of vapor to the crude argon column. This implies that the vapor flow through section II of the low pressure column must be decreased (as total vapor flow from the bottom of the low pressure column is nearly fixed). One way to accomplish this would be to increase the oxygen content of the gaseous feed stream to the top of section II of the low pressure column because that would decrease the vapor flow requirement through this section of the low pressure column. However, since this gaseous feed stream is derived from the crude liquid oxygen, its composition is fixed within a narrow range as described above. Therefore, the suggested solution is not possible with the current designs and the argon recovery is thus limited.

U.S. Pat. No. 4,670,031 suggests a method to increase the argon recovery which partially overcomes the above discussed deficiency. This is achieved by the use of an additional boiler/condenser. This additional boiler/condenser allows the exchange of latent heats between an intermediate point of the crude argon column and a location in section II of the low pressure column. Thus a vapor stream is withdrawn from an intermediate height of the crude argon column and is condensed in this additional boiler/condenser and sent back as intermediate reflux to the crude argon column. The liquid to be vaporized in this boiler/condenser is withdrawn from the section II of the low pressure column and the heated fluid is sent back to the same location in the low pressure column. A boiler/condenser is also used at the top of the crude argon column to provide the reflux needed for the top section of this column. A portion of the crude liquid oxygen is vaporized in this top boiler/condenser analogous to the conventional process. The use of the additional boiler/condenser provides some of the vapor at a location in Section II where oxygen content in the vapor stream is higher than that in the crude liquid oxygen stream. This decreases the minimum vapor flow requirement of this section and thereby allows an increased vapor flow to the bottom of the crude argon column. This leads to an increase in argon recovery.

Even though the method suggested in the U.S. Pat. No. 4,670,031 leads to an increase in argon recovery, it is not totally effective. This is due to the fact that all the vapor feed to the crude argon column does not reach the top of this column and an increased liquid/vapor ratio is used in the bottom section of this column. Since argon is withdrawn from the top of the crude argon column and a certain liquid/vapor ratio is needed in the top section to achieve the desired crude argon purity, the relatively lower vapor flow in the top section (as compared to the bottom section) limits the argon recovery. It is desirable to have a scheme, which will produce an increased vapor flow in the top section of the crude argon column so that argon can be recovered in even greater quantities.

U.S. Pat. No. 4,822,395 teaches another method of argon recovery. In this method all the crude liquid oxygen from the bottom of the high pressure column is fed to the low pressure column. The liquid from the bottom of the low pressure column is reduced in pressure and boiled in the boiler/condenser located at the top of the crude argon column. The crude argon column overhead vapor is condensed in this boiler/condenser and provides reflux to this column. There are some disadvantages to this method. The liquid from the bottom of the low pressure column is nearly pure oxygen and since it condenses the crude argon overhead vapor, its pressure when boiled will be much lower than the low pressure column pressure. As a result, the oxygen gas recovered will be at a pressure which is significantly lower than that of the low pressure column and when oxygen is a desired product this represents a loss of energy. Furthermore, this arrangement requires that the low pressure column operates at a pressure which is significantly higher than the ambient pressure. If nitrogen is not a desired product or if it is not needed at a higher pressure, then this process will require excessive energy consumption. Another drawback of the suggested solution is that since crude argon overhead is only condensed against pure oxygen, the amount of vapor which can be fed to the crude argon column is limited by the amount of oxygen present in the air. In some cases, this can lead to lower argon recoveries.

To generate an ultra high purity (>99.5%) oxygen product, U.S. Pat. No. 4,615,716 proposes an oxygen recycle to increase the reboil vapor rate in the low pressure column bottom section. A vapor draw is taken from the low pressure column at the same location as the feed to the crude argon column. The stream is compressed and sent to an auxiliary reboiler for the low pressure column to generate additional vapor traffic in the bottom section. The stream condenses in the reboiler and is sent back to the low pressure column at the same location as the crude argon column return stream. Although this method increases the reboil vapor rate, it does not allow for additional vapor to be sent to the crude argon column. As a result, additional argon recovery is limited.

U.S. Pat. No. 4,832,719 boils some liquid nitrogen from the top of the high pressure column against an argon-rich vapor stream from the crude argon column. In this scheme, argon recovery is not increased. This is because the boilup in the bottom of the low pressure column is not increased and therefore additional vapor flow to the crude argon column is not available. In this patent, a medium pressure nitrogen is coproduced as the added benefit. This patent recognizes that in certain cases, the amount of liquid nitrogen reflux needed by the low pressure column is less than that produced by the high pressure column. This difference in the liquid nitrogen can be boiled by an argon-rich vapor stream from the crude argon column to coproduce medium pressure gaseous nitrogen product.

U.S. Pat. No. 4,575,388 suggests an argon heat pump to increase argon recovery. A portion of the crude argon column overhead is warmed, compressed, and then condensed by boiling a liquid oxygen stream from the bottom of the low pressure column. The condensed argon is then returned to the crude argon column as overhead reflux. The disadvantage of this heat pumping scheme is that the recovery of argon is only from the bottom section of the low pressure column because only the concentration of argon in the oxygen product is reduced. As a result, much argon still can be lost from the top section of the low pressure column in the low pressure column overhead and waste streams.

Another method for increasing the argon recovery is through the use of the conventional low pressure nitrogen (LPGAN) heat pump. In this well-known method, the heat pump fluid is taken from the low pressure nitrogen product stream such as at the warmed outlet of the main exchangers. The stream gets compressed up to the appropriate pressure as determined by the high pressure column pressure. The stream is then cooled and sent to the high pressure column where it enters the boiler/condenser and condenses by boiling up the bottoms of the low pressure column. The condensed nitrogen stream is then sent to the low pressure column as additional overhead reflux. Unlike the argon heat pump proposed in U.S. Pat. No. 4,575,388, the LPGAN heat pump decreases argon losses in both the top and the bottom products of the low pressure column. The limitation behind this heat pump, however, is that the compression requirement for the heat pump fluid is very high. As a result, this heat pumping strategy is very energy intensive and consequently economically unattractive.

Finally, another process teaching a method to improve argon recovery is taught in U.S. Pat. No. 5,114,449. This prior art process is shown in FIG. 2 which is also discussed later in this disclosure. In this process, all the crude liquid $O_2$ from the bottom of the high pressure column is fed to the low pressure column. The vapor at the top of the crude argon column is now condensed by heat exchange with a liquid stream in the low pressure column. This heat exchange place is located between the crude liquid oxygen feed location and the withdrawal point of the argon-rich vapor stream which is the feed stream for the crude argon column. This thermal linkage between the crude argon and the low pressure columns leads to enhanced argon recovery when compared to the process shown in FIG. 1 and the one taught in U.S. Pat. No. 4,670,031. However, in certain instances, this enhanced argon recovery is still not sufficient to meet the increased demand of argon and it is desirable to envision methods which would further increase the argon recovery.

Clearly then, there is a need for a process which does not have the above-mentioned limitations and can produce argon with greater recoveries.

SUMMARY OF THE INVENTION

The present invention is an improvement to a cryogenic air distillation process producing argon using a multiple column distillation system comprising a high pressure column, a low pressure column and a crude argon column. The improvement is for increasing the argon recovery of the process and comprises using a first heat pump cycle to transfer refrigeration from the bottom of the low pressure column to the top of the crude argon column and a second heat pump cycle to transfer refrigeration from the bottom of the low pressure column to the top of the low pressure column. Both heat pump cycles comprise the following steps:
  (a) condensing the heat pump fluid by heat exchange against vaporizing liquid oxygen from the bottom of the low pressure column;
  (b) reducing the pressure of the heat pump fluid;
  (c) vaporizing the heat pump fluid by heat exchange against either (1) condensing gaseous argon from the top of the crude argon column wherein at least a portion of the condensed argon is returned to the top of the crude argon column to provide reflux for the crude argon column (with respect to the first heat pump cycle) or (2) condensing gaseous nitrogen from the top of the low pressure column wherein at least a portion of the condensed nitrogen is returned to the top of the low pressure column to provide reflux for the low pressure column (with respect to the second heat pump cycle); and
  (d) compressing the heat pump fluid.

DETAILED DESCRIPTION OF THE INVENTION

Figure 1:
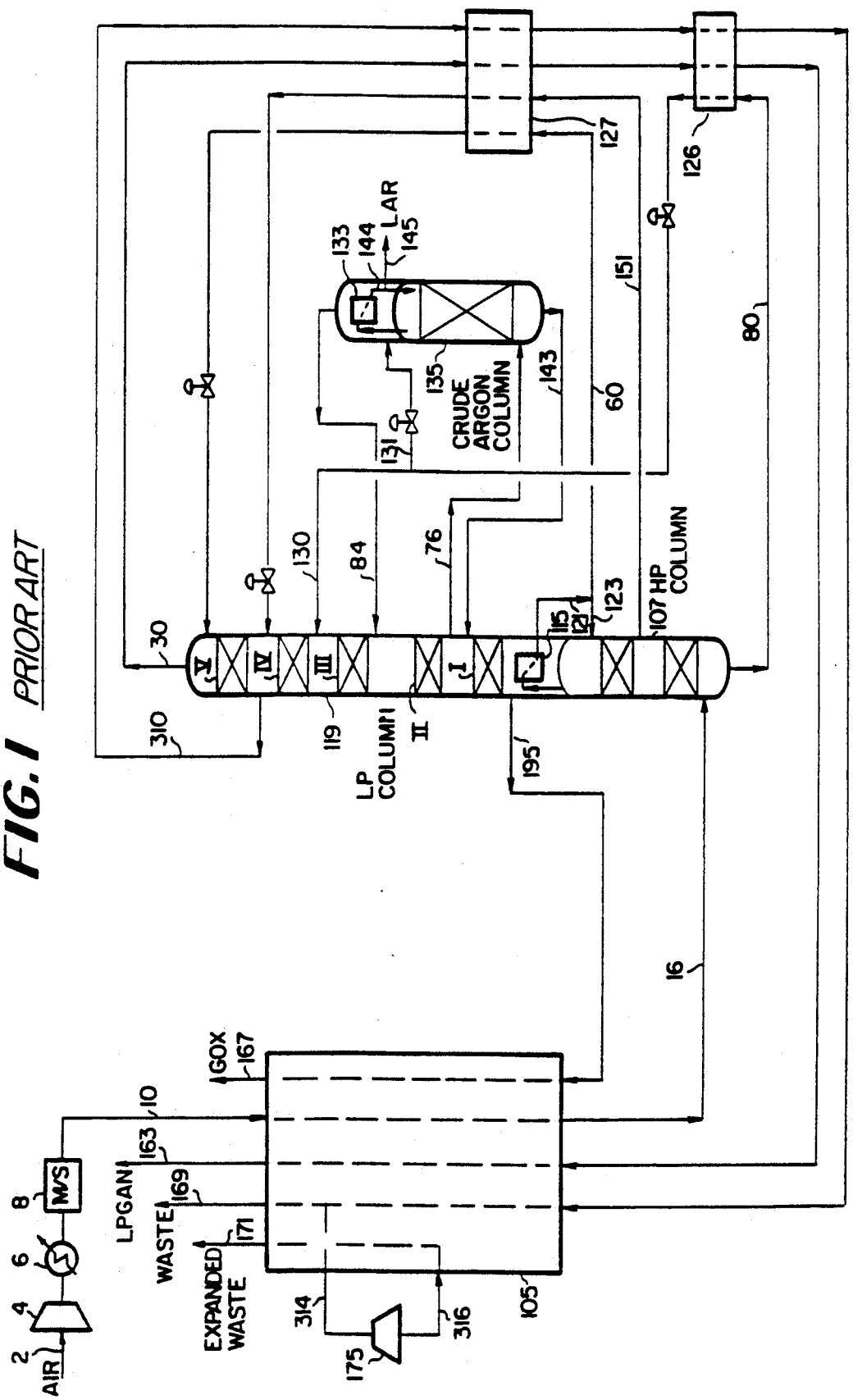
FIG. 1 is a schematic diagram of a typical cryogenic air separation process producing argon as found in the prior art.

To better understand the present invention, it is important to understand the background art. As an example, a typical process for the cryogenic separation of air to produce nitrogen, oxygen and argon products using a three column system is illustrated in FIG. 1. With reference to FIG. 1, a feed air stream 2 is pressurized in compressor 4, cooled against cooling water in heat exchanger 6, and cleaned of impurities that will freeze out at cryogenic temperatures in mole sieves 8. This clean, pressurized air stream 10 is then cooled in heat exchanger 105 and fed via line 16 to high pressure column 107 wherein it is rectified into a nitrogen-rich overhead and a crude liquid oxygen bottoms. The nitrogen-rich overhead is condensed in reboiler/condenser 115, which is located in the bottoms liquid sump of low pressure column 119, and removed from reboiler/condenser 115 via line 121 and further split into two parts. The first part is returned to the top of high pressure column 107 via line 123 to provide reflux; the second part, in line 60, is subcooled in heat exchanger 127, reduced in pressure and fed to top of low pressure column 119 as reflux. The crude liquid oxygen bottoms from high pressure column 107 is removed via line 80, subcooled in heat exchanger 126, reduced in pressure and split into two portions, lines 130 and 131 respectively. The first portion in line 130 is fed to an upper intermediate location of low pressure column 119 as crude liquid oxygen reflux for fractionation. The second portion in line 131 is further reduced in pressure and heat exchanged against the overhead from crude argon column 135 wherein it is vaporized and subsequently fed via line 84 to an intermediate location of low pressure column 119 for fractionation. A side stream containing argon and oxygen is removed from a lower intermediate location of low pressure column 119 and fed via line 76 to crude argon column 135 for rectification into a crude argon overhead stream and bottoms liquid which is recycled via line 143 back to low pressure column 119. The crude argon column overhead is fed to boiler/condenser 133 where it is condensed against the second portion of the subcooled crude liquid oxygen bottoms in line 131. The condensed crude argon is then returned to crude argon column 135 via line 144 to provide reflux. A portion of line 144 is removed as the crude liquid argon product via line 145. Also as a feed to low pressure column 119, a side stream is removed from an intermediate location of high pressure column 107 via line 151, cooled in heat exchanger 127, reduced in pressure and fed to an upper location of low pressure column 119 as added reflux. To complete the cycle, a low pressure nitrogen-rich overhead is removed via line 30 from the top of low pressure column 119, warmed to recover refrigeration in heat exchangers 127, 126 and 105, and removed from the process as the low pressure nitrogen product via line 163. An oxygen enriched vapor stream is removed via line 195 from the vapor space in low pressure column 119 above reboiler/condenser 115, warmed in heat exchanger 105 to recover refrigeration and removed from the process via line 167 as the gaseous oxygen product. Finally, an upper vapor stream is removed from low pressure column 119 via line 310, warmed to recover refrigeration in heat exchangers 127, 126 and 105 and then vented from the process as waste in line 169. To provide refrigeration, a portion of line 310 is removed from heat exchanger 105 via line 314, expanded in expander 175 and returned to heat exchanger 105 via line 316 prior to being vented from the process as expanded waste in line 171.

Figure 2:
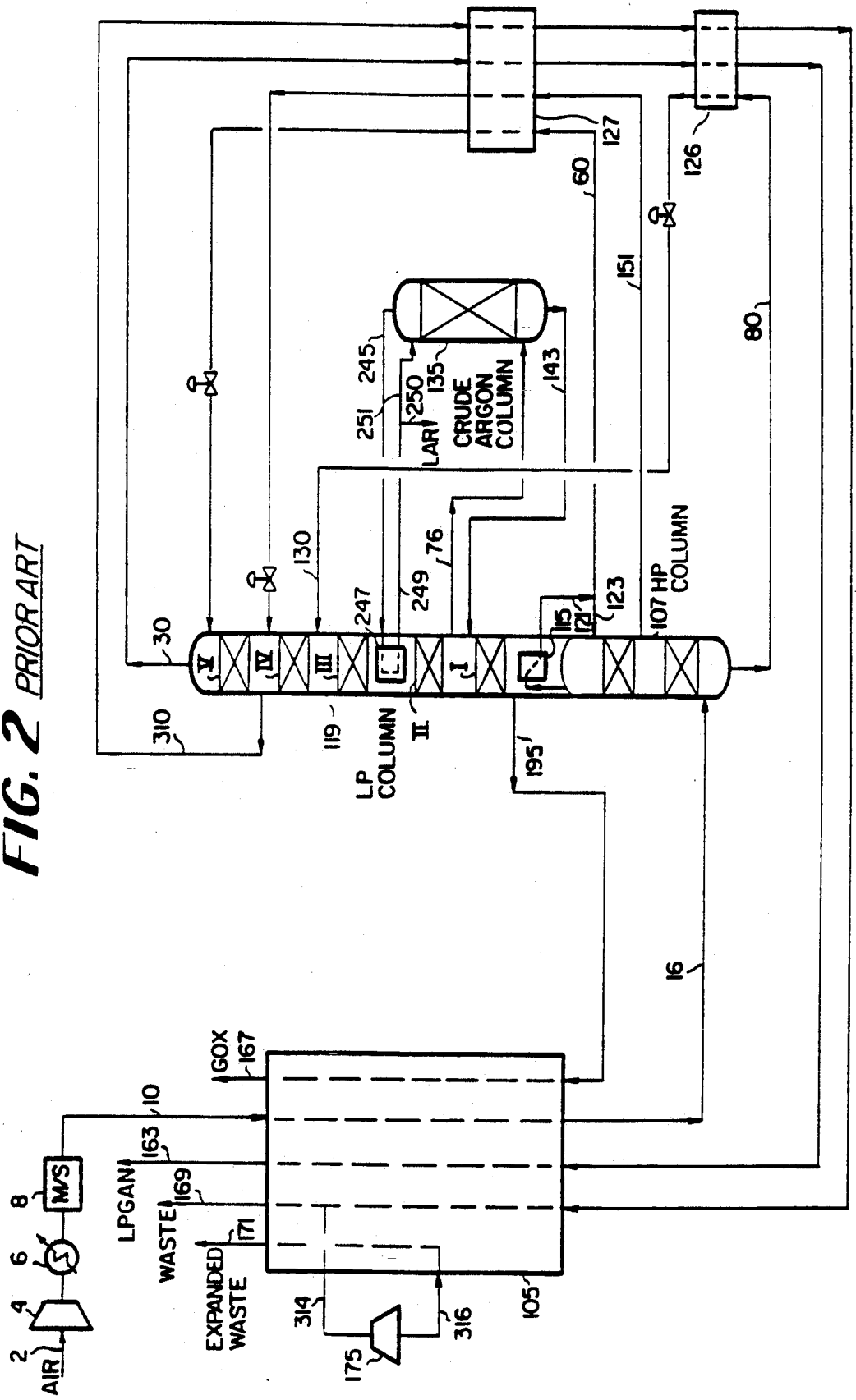
FIG. 2 is a schematic diagram of a second cryogenic air separation process producing argon as found in the prior art.

The prior art process shown in FIG. 2 is the same as the prior art process shown in FIG. 1 (similar features of the FIG. 2 process utilize common numbering with FIG. 1) except it incorporates the invention disclosed in U.S. Pat. No. 5,114,449. The invention disclosed in U.S. Pat. No. 5,114,449 teaches a better method of thermally linking the top of the crude argon column with the low pressure column, thereby producing argon at higher recoveries vis-a-vis FIG. 1's process. Referring now to FIG. 2, the entire crude liquid oxygen stream 80 is fed to a suitable location in the low pressure column via line 130. Unlike FIG. 1, no portion of the crude liquid oxygen stream 80 is boiled against the crude argon column overhead. Instead, liquid descending low pressure column 119 (selected from a location between the feed point of the crude liquid oxygen stream 80 and the removal point for the argon containing gaseous side stream 76) is boiled against the crude argon column overhead. The crude argon column overhead is removed as an argon-rich vapor overhead in line 245 and fed to boiler/condenser 247 which is located in low pressure column 119 between sections II and III. Herein the argon-rich vapor overhead is condensed in indirect heat exchange against the intermediate liquid descending low pressure column 119. The condensed, argon-rich liquid is removed from boiler/condenser 247 via line 249 and split into two portions. The first portion is fed to the top of crude argon column 135 via line 251 to provide reflux for the column. The second portion is removed from the process via line 250 as crude liquid argon product.

The current invention suggests an improvement for enhanced argon recovery in a system which uses a high pressure column, a low pressure column and a crude argon column. The processes depicted in FIGS. 1 and 2 which are described above are both representative of such a system. The improvement comprises using a first heat pump cycle to transfer refrigeration from the bottom of the low pressure column to the top of the crude argon column and a second heat pump cycle to transfer refrigeration from the bottom of the low pressure column to the top of the low pressure column. Both heat pump cycles comprise the following steps:

(a) condensing the heat pump fluid by heat exchange against vaporizing liquid oxygen from the bottom of the low pressure column;

(b) reducing the pressure of the heat pump fluid;

(c) vaporizing the heat pump fluid by heat exchange against either (1) condensing gaseous argon from the top of the crude argon column wherein at least a portion of the condensed argon is returned to the top of the crude argon column to provide reflux for the crude argon column (with respect to the first heat pump cycle) or (2) condensing gaseous nitrogen from the top of the low pressure column wherein at least a portion of the condensed nitrogen is returned to the top of the low pressure column to provide reflux for the low pressure column (with respect to the second heat pump cycle); and (d) compressing the heat pump fluid.

The above heat pump cycle can be termed an "indirect reflux" heat pump cycle insofar as the reflux provided in step (c) is indirectly provided via vaporization of the heat pump fluid. Although there exists many heat pump fluids that can be used in the heat pump cycles, it is preferred that either nitrogen, oxygen, argon or mixtures thereof be used as the heat pump fluid. When a mixture is used, its composition can be appropriately chosen. It should be noted that where argon is used as the first cycle's heat pump fluid or where nitrogen is used as the second cycle's heat pump fluid, the above indirect reflux heat pump cycle can be substituted with a "direct reflux" heat pump cycle. In such a case, steps (c) and (d) of both heat pump cycles simplify as follows:

(c) feeding the heat pump fluid directly as reflux to either (1) the top of the crude argon column (with respect to the first heat pump cycle) or (2) the top of the low pressure column (with respect to the second heat pump cycle); and (d) compressing a second stream of the heat pump fluid. It should further be noted that selection of the first heat pump cycle as either a direct reflux heat pump cycle or an indirect heat pump cycle is independent of the selection of the second heat pump cycle as either a direct reflux heat pump cycle or an indirect heat pump cycle.

Both the first and second heat pump cycles effect a higher argon recovery by first extracting refrigeration from the bottom of the low pressure column through condensation of each cycle's respective heat pump fluid in step (a). By extracting refrigeration from the bottom of the low pressure column, additional boilup is generated in the bottom of the low pressure column. Due to this additional boilup, more vapor is available as feed to the crude argon column. This in effect minimizes the loss of argon in the oxygen product from the bottom of the low pressure column. The first heat pump cycle subsequently uses its extracted refrigeration to provide reflux to the top of the crude argon column, thereby further increasing the argon recovery by assisting in the separation of the argon product from the argon column feed. Meanwhile, the second heat pump cycle uses its extracted refrigeration to provide reflux to the top of the low pressure column. This low pressure column reflux helps to "wash down" the argon from the top of the low pressure column, thus minimizing the loss of argon in the low pressure column overhead.

Figure 3:
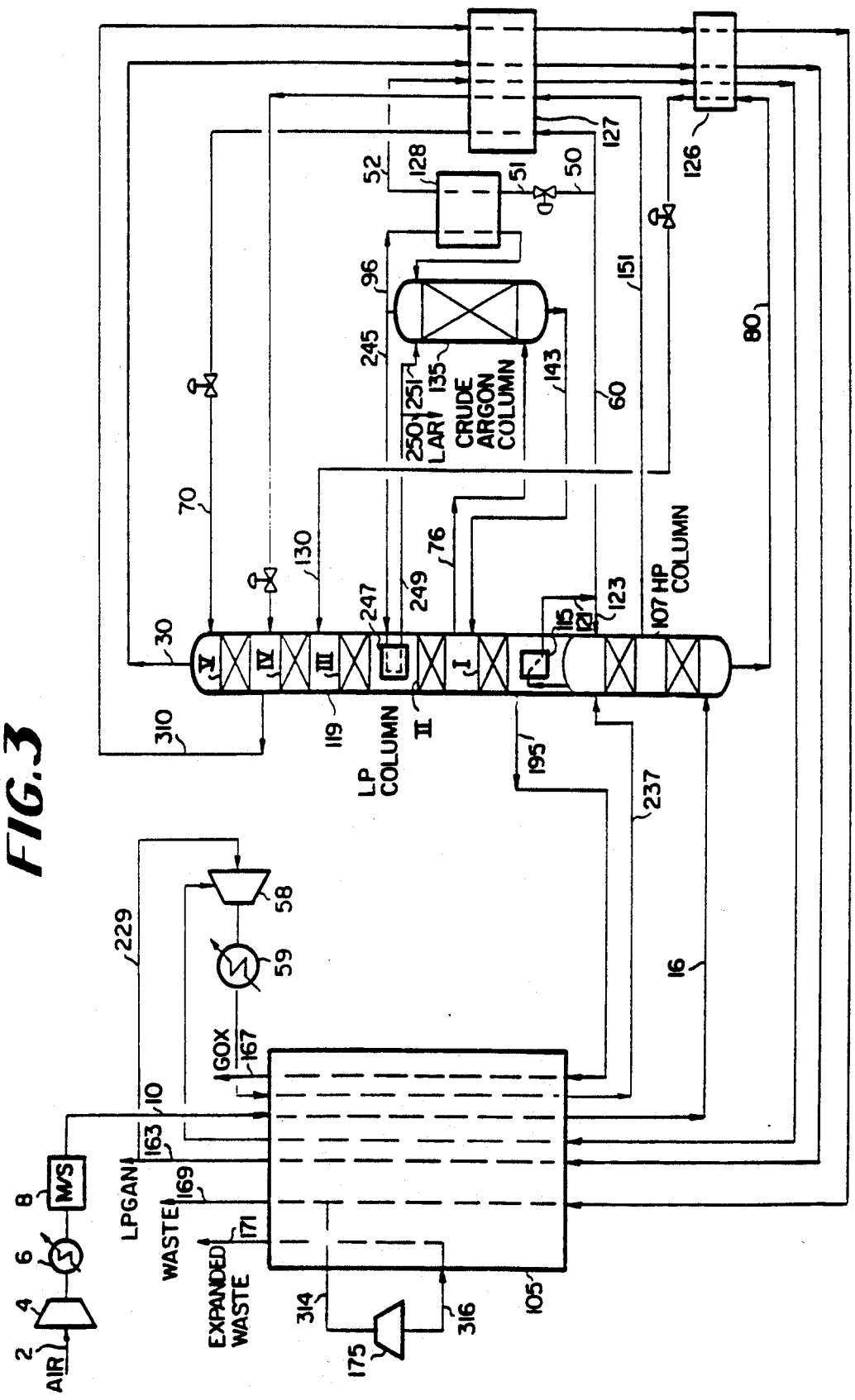
FIG. 3 is a schematic diagram of a first embodiment of the process of the present invention.

The process of the present invention will now be illustrated by the following embodiments:

1. Combination medium pressure nitrogen (MPGAN) and low pressure nitrogen (LPGAN) heat pump cycles (FIG. 3).

Figure 4:
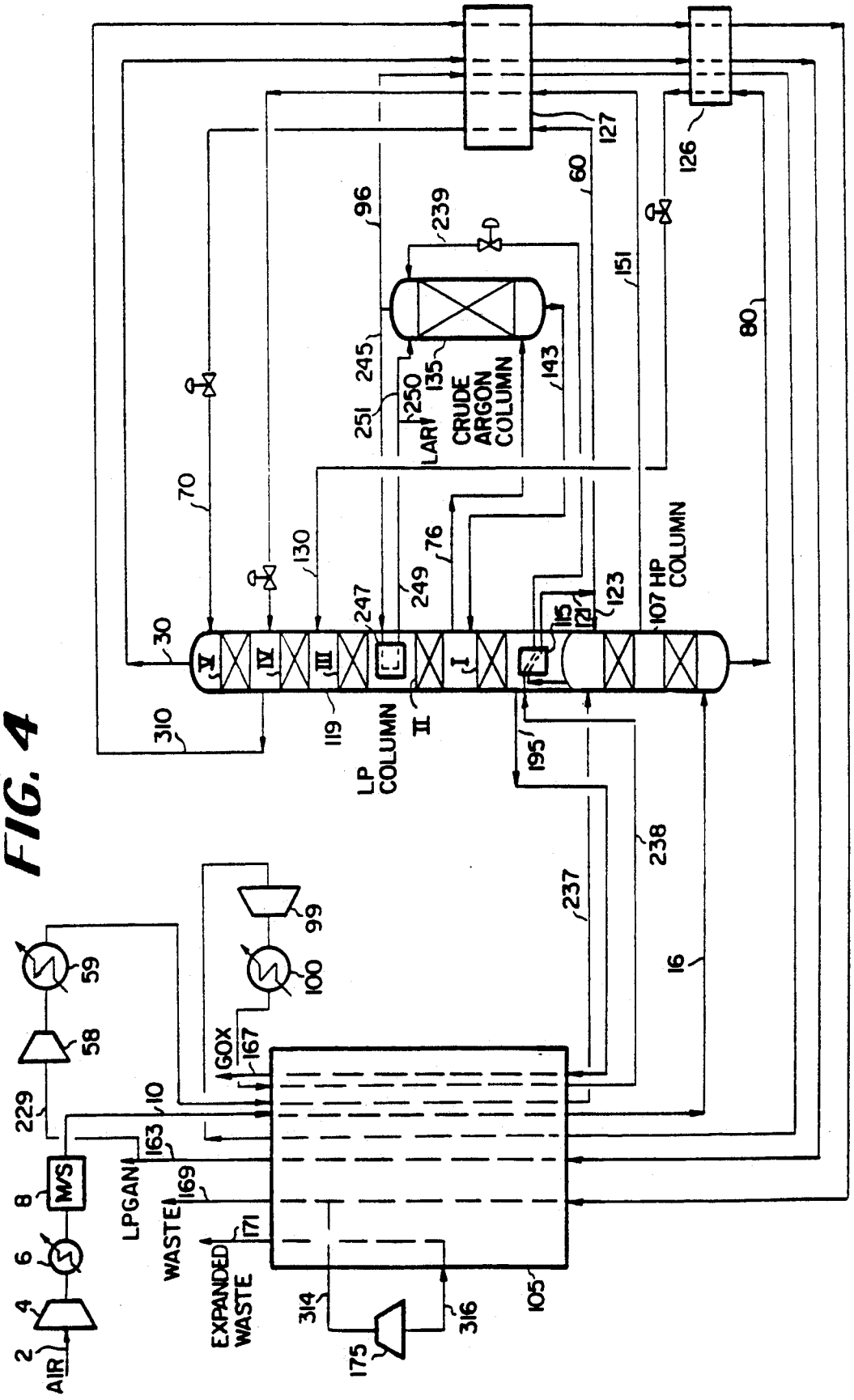
FIG. 4 is a schematic diagram of a second embodiment of the process of the present invention.

2. Combination medium pressure argon (MPAR) and LPGAN heat pump cycles (FIG. 4)

Figure 5:
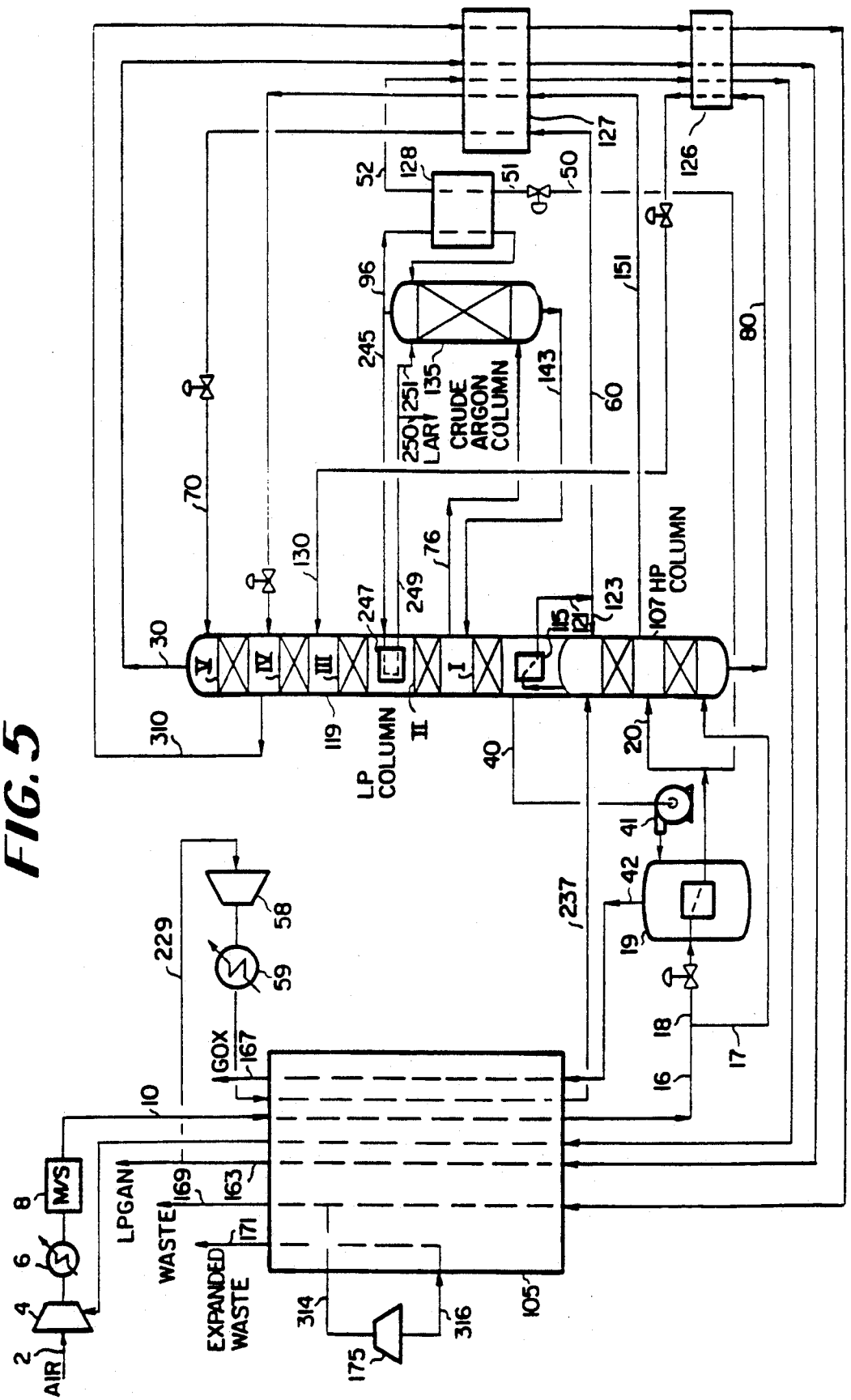
FIG. 5 is a schematic diagram of a third embodiment of the process of the present invention.

3. Combination medium pressure air (MPAIR) and LPGAN heat pump cycles (FIG. 5)

Figure 6:
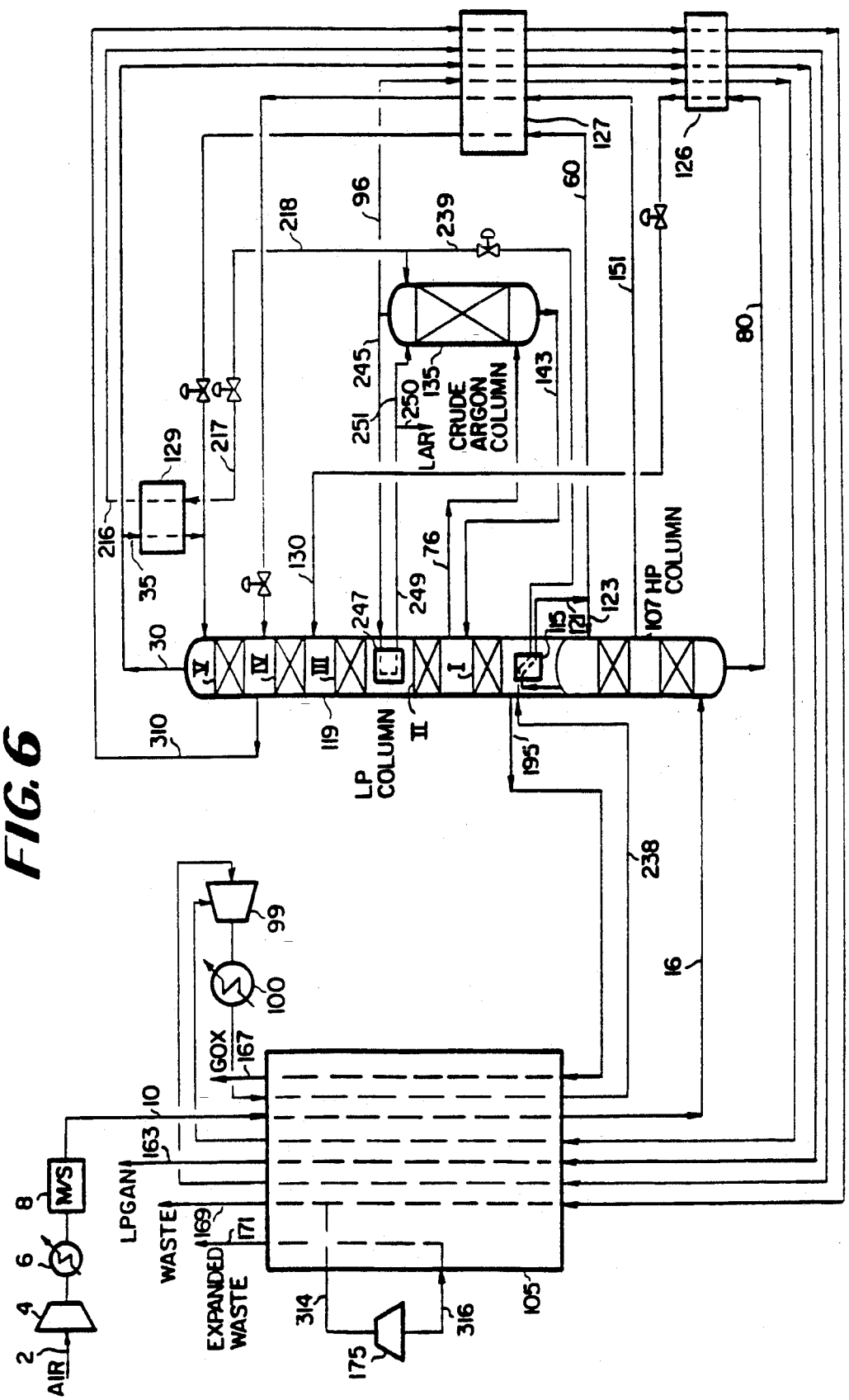
FIG. 6 is a schematic diagram of a fourth embodiment of the process of the present invention.

4. Combination MPAR and low pressure argon (LPAR) heat pump cycles (FIG. 6)

Figure 7:
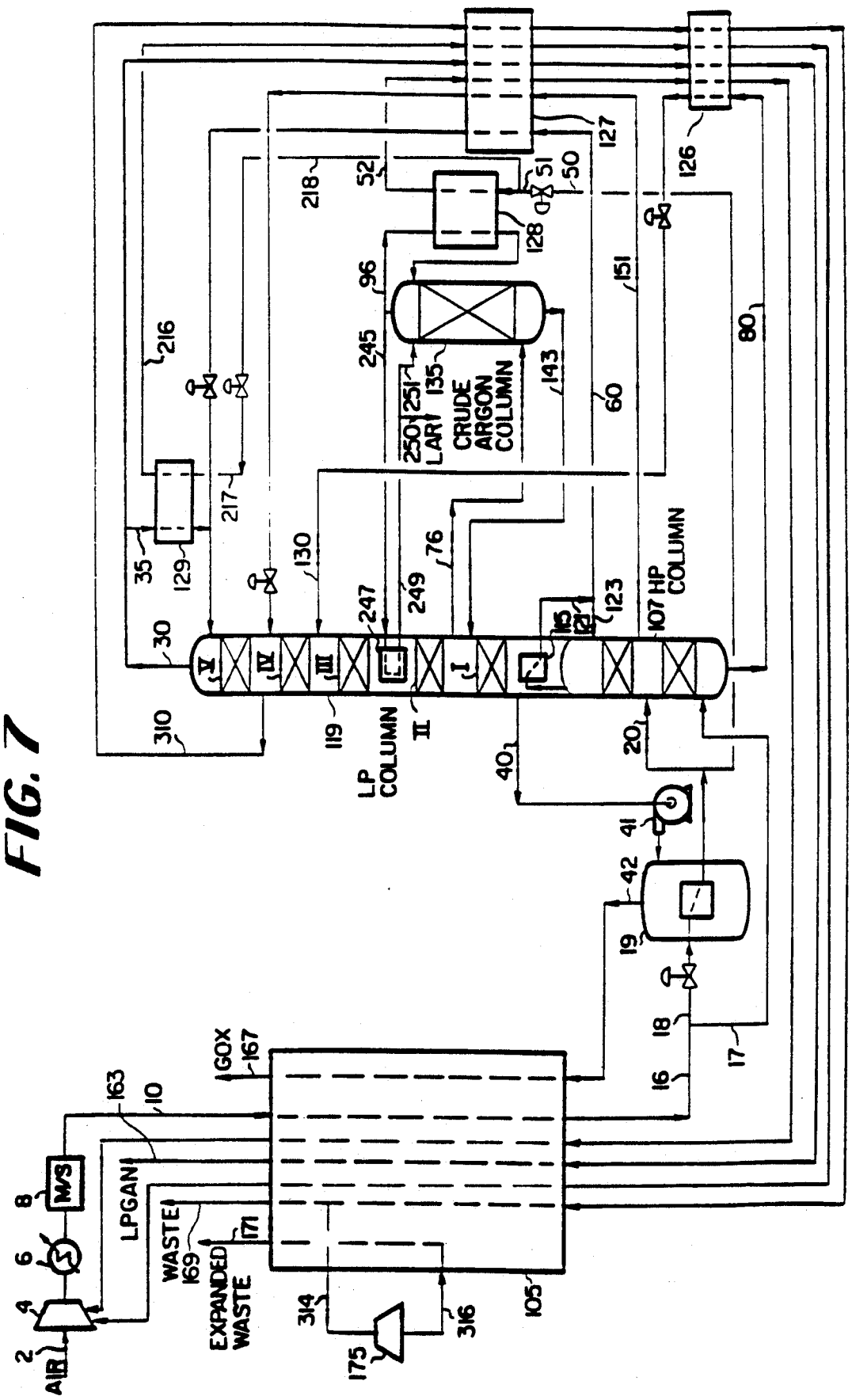
FIG. 7 is a schematic diagram of a fifth embodiment of the process of the present invention.

5. Combination MPAIR and low pressure air (LPAIR) heat pump cycles (FIG. 7).

The above embodiments are by no means exhaustive and are listed here only as examples to illustrate the broad scope of the present invention. The significant factor behind these combinations of first heat pump cycles (i.e. MPGAN, MPAR and MPAIR) and second heat pump cycles (i.e. LPGAN, LPAR, and LPAIR) is that proper selection of a particular first or second heat pump cycle can ensure the most efficient recovery of argon in the air separation unit. In general, the combination enables a trade-off between the amount of heat pumping for the top of the low pressure column and the top of the crude argon column in order to obtain maximum argon recovery for a particular power level.

In the first three schemes listed above, the invention involves using the conventional LPGAN heat pump cycle as the second heat pump cycle. As discussed previously in the BACKGROUND OF THE INVENTION, the LPGAN heat pump cycle's high compression requirement makes it economically unattractive. Combining the LPGAN heat pump with a less energy intensive heat pump cycle, however, can enable a proper trade-off of the reflux needs of the low pressure and crude argon columns for a given boilup at the bottom of the low pressure column. Specifically, the LPGAN heat pump cycle is primarily used to provide reflux to the top of the low pressure column, while the other heat pump fluid is used to provide reflux to the top of the crude argon column.

FIG. 3 illustrates the combination MPGAN and LPGAN heat pump cycles. Except for incorporation of the combination MPGAN and LPGAN heat pump cycles, the process shown in FIG. 3 is identical to the prior art process shown in FIG. 2 (similar features of the FIG. 3 process utilize common numbering with FIG. 2). Stream 50 comprises the MPGAN heat pump fluid and consists of a portion of the nitrogen overhead from high pressure column 107 which is condensed against vaporizing liquid oxygen from the bottom of low pressure column 119 in reboiler/condenser 115. The draw for the stream 50 can be located either before cold subcooler 127 as shown in FIG. 3 or after cold subcooler 127. The condensed heat pump fluid in stream 50 is reduced in pressure (stream 51) and vaporized by exchanging heat to liquefy a portion of the crude argon column overhead, stream 96, in boiler/condenser 128. The pressure is determined by the temperature at which the overhead argon stream will condense while accounting for a proper approach temperature in boiler/condenser 128. The liquefied argon stream is sent back to the crude argon column as additional reflux. The vaporized heat pump fluid in stream 52 is sent through subcoolers 127 and 126 and main exchanger 105 before being compressed to an appropriate pressure in compressor 58 as determined by the pressure at the top of the high pressure column. The MPGAN heat pump fluid is then cooled against cooling water in cooler 59 and then further cooled in main exchanger 105. (If the desired exit temperature from cooler 59 is lower than that which can be achieved with cooling water, other refrigeration means such as a freon unit or an absorption chill unit can be utilized in cooler 59.) The cold MPGAN heat pump fluid is then recycled as feed to the top of the high pressure column via portion of stream 237 where it combines with the high pressure column overhead and enters boiler/condenser 115 prior to beginning a subsequent MPGAN heat pump cycle. The additional LPGAN heat pump fluid is taken from low pressure nitrogen product stream 163 at the outlet of main exchanger 105 which corresponds to stream 229 in FIG. 3. The stream gets compressed up to the appropriate pressure in compressor 58 as determined by the high pressure column pressure. One method for compressing the LPGAN heat pump stream is shown in FIG. 3 where a stage-wise compression approach is taken. The LPGAN heat pump stream is first compressed to a medium pressure and then combined with the MPGAN heat pump stream. The combined stream is then further compressed to the appropriate pressure at a secondary stage. The combined stream is then cooled against cooling water in cooler 59 and then further cooled in main exchanger 105 before being sent to the high pressure column via portion of stream 237 where it enters boiler/condenser 115 and condenses by boiling up the bottoms of the low pressure column. The LPGAN heat pump fluid is then removed as a portion of the nitrogen overhead from high pressure column 107, subcooled in subcooler 127, reduced in pressure and subsequently sent to the low pressure column as additional pure reflux via portion of stream 70 prior to beginning a subsequent LPGAN heat pump cycle. The increased reflux is beneficial for recovering argon from the top of the low pressure column. In FIG. 3, the flow rate for stream 50 is less than the total recycle flow in stream 237 to the high pressure column. The difference between the two flow rates is made-up by the LPGAN heat pump stream 229. It is worth mentioning that in FIG. 3, the liquid nitrogen stream 50 may be boiled in the same boiler/condenser where the rest of the crude argon column overhead vapor is condensed. For this purpose, additional heat exchange passage will have to be provided in this boiler/condenser. In FIG. 3, this boiler/condenser is designated as unit 247. The advantage of this arrangement is that it will eliminate the need for a separate boiler/condenser 128.

FIG. 4 illustrates the combination MPAR and LPGAN heat pump cycles. Except for incorporation of the combination MPAR and LPGAN heat pump cycles, the process shown in FIG. 4 is identical to the prior art process shown in FIG. 2 (similar features of the FIG. 4 process utilize common numbering with FIG. 2). The LPGAN heat pump cycle corresponds to the LPGAN heat pump cycle described previously for the combination MPGAN and LPGAN heat pump cycles. The MPAR heat pump cycle is the argon heat pump suggested by U.S. Pat. No. 4,575,388 and is integrated into the flowsheet of FIG. 4 as follows. A portion of the crude argon column overhead stream 96 is warmed through subcoolers 127 and 126 and main exchanger 105 and compressed in compressor 99 to an appropriate pressure which is determined by that pressure which will allow the argon stream to condense by heat exchange against the low pressure column bottoms. The compressed argon stream is cooled in cooler 100 and main exchangers 105 and then sent via stream 238 to reboiler/condenser 115 where it is condensed by heat exchange with the low pressure column bottoms. In FIG. 4 the MPAR heat pump stream 238 is condensed in separate passages of reboiler/condenser 115. Optionally, a separate heat exchanger may be used for the condensation of MPAR heat pump stream 238. The condensed argon stream is then reduced in pressure to the pressure of the crude argon column and fed to the top of the crude argon column as reflux stream 239 prior to beginning a subsequent MPAR heat pump cycle. Note that a portion of liquid argon stream 239 will flash as it is reduced to the crude argon column pressure. To minimize flashing, the condensed argon stream 239 may be subcooled in subcooler 127 and then fed to the top of the crude argon column.

The combination MPAIR and LPGAN heat pump cycles is illustrated in FIG. 5. Except for incorporation of the combination MPAIR and LPGAN heat pump cycles, the process shown in FIG. 5 is identical to the prior art process shown in FIG. 2 (similar features of the FIG. 5 process utilize common numbering with FIG. 2). The LPGAN heat pump cycle corresponds to the LPGAN heat pump cycle described previously for the combination MPGAN and LPGAN heat pump cycles. The MPAIR heat pump cycle is integrated into the flowsheet of FIG. 5 by using an air stream to boil up liquid oxygen from the bottom of the low pressure column. Stream 50 comprises the MPAIR heat pump fluid and consists of a portion of the compressed, cooled feed air in stream 16 which is condensed in boiler/condenser 19 by boiling up a liquid oxygen stream 40 from the low pressure column. The remaining feed air in stream 16 enters the high pressure column through stream 17. Note that liquid oxygen stream 40 is at a higher pressure at boiler/condenser 19 as compared to the low pressure column due to the static head created from the difference in elevation. Optionally, the liquid stream can be additionally boosted to a higher pressure by pump 41. The condensed MPAIR heat pump fluid in stream 50 is reduced to the appropriate pressure (stream 51) and vaporized by condensing a portion of the crude argon distillation overhead stream 96 in boiler/condenser 128. Similar to the MPGAN heat pump cycle, the pressure is determined by the temperature at which the crude argon overhead condenses while accounting for a proper approach temperature in boiler/condenser 128. The condensed overhead steam 96 is sent back to the crude argon column as additional reflux. The vaporized MPAIR heat pump fluid in stream 52 is warmed through subcoolers 127 and 126 and main exchanger 105 before being compressed to an appropriate pressure as determined by the pressure of the high pressure column. As shown in FIG. 3, one option for compressing the MPAIR heat pump fluid is to feed it to an intermediate stage of main air compressor 4. Alternatively, a separate heat pump compressor may be used with the advantage that the MPAIR heat pump fluid no longer needs to go through mole sieves 8 with the incoming air stream 2. The compressed MPAIR heat pump fluid is then combined with the incoming air stream downstream of mole sieves 8. In FIG. 5, the MPAIR heat pump fluid corresponds to the flow of stream 50 and not the condensing air stream 18. The difference is the liquid air stream 20 which is sent to the high pressure column and does not get heat pumped. Also, note that the air stream 16 has a flow equivalent to the sum of the incoming air stream 2 and the heat pump fluid in stream 50. A key advantage of the MPAIR heat pump cycle as shown in FIG. 5 is that an elevated pressure gaseous oxygen product stream 42 is produced. The static head created by the liquid oxygen stream from the bottom of the low pressure column along with the possible use of pump 41 elevates the pressure of stream 40. As a result, the vaporization of the stream creates a higher pressure oxygen product stream 42 as compared to the pressure at the bottom of low pressure column. Note that in this option, all of the gaseous oxygen product is derived from the vaporization of the liquid oxygen product. This allows all the boilup from reboiler/condenser 115 to travel up the low pressure column.

FIG. 6 illustrates the combination MPAR and LPAR heat pump cycles. Except for incorporation of the combination MPAR and LPAR heat pump cycles, the process shown in FIG. 6 is identical to the prior art process shown in FIG. 2 (similar features of the FIG. 6 process utilize common numbering with FIG. 2). The MPAR heat pump cycle corresponds to the MPAR heat pump cycle described previously for the combination MPAR and LPGAN heat pump cycles. The LPAR heat pump cycle is integrated into the flowsheet of FIG. 6 by using a portion of the condensed argon stream 239 as the LPAR heat pump fluid. Instead of sending the entire stream 239 to the crude argon column as reflux, a fraction is taken as the LPAR heat pump fluid in stream 218. The stream is reduced to the appropriate pressure (stream 217) which pressure is determined by the dew point of stream 35 from the top of the low pressure column while accounting for a proper approach temperature in boiler/condenser 129. Stream 35 is condensed by vaporizing stream 217 in boiler/condenser 129 and then sent back to the low pressure column as additional reflux to recover argon from the top of the low pressure column. The vaporized LPAR heat pump stream 216 is warmed through subcoolers 127 and 126 and main exchanger 105. The stream is then compressed up to the appropriate pressure in compressor 99 as determined by the high pressure column pressure. One method for compressing the LPAR heat pump stream is shown in FIG. 6 where a stage-wise compression approach is taken. The LPAR heat pump stream is first compressed to a medium pressure and then combined with the warmed MPAR heat pump stream 96. The combined stream is then further compressed to the appropriate pressure at a secondary stage. The combined stream is then cooled by cooling water in cooler 100 and then further cooled through main exchanger 105 before being sent via stream 238 to boiler/condenser 115 where it condenses by boiling up the bottoms of the low pressure column. In this particular embodiment, the MPAR heat pump cycle provides additional reflux for the crude argon column, while the LPAR heat pump cycle create additional reflux for the low pressure column.

FIG. 7 illustrates the combination MPAIR and LPAIR heat pump cycles. Except for incorporation of the combination MPAIR and LPAIR heat pump cycles, the process shown in FIG. 7 is identical to the prior art process shown in FIG. 2 (similar features of the FIG. 7 process utilize common numbering with FIG. 2). The MPAIR heat pump cycle corresponds to the MPAIR heat pump cycle described previously for the combination MPAIR and LPGAN heat pump. The LPAIR heat pump cycle is integrated into the flowsheet of FIG. 7 by using a portion of the condensed air stream 51 as the LPAIR heat pump fluid. Instead of sending the entire stream 51 to boiler/condenser 128, a fraction is taken as the LPAIR heat pump fluid in stream 218. The stream is reduced to the appropriate pressure (stream 217) which pressure is determined by the dew point of stream 35 from the top of the low pressure column while accounting for a proper approach temperature in boiler/condenser 129. Stream 35 is condensed by vaporizing stream 217 in boiler/condenser 129 and then sent back to the low pressure column as additional reflux to recover argon from the top of the low pressure column. The vaporized LPAIR heat pump stream 216 is warmed through subcoolers 127 and 126 and main exchanger 105. The stream is then compressed up to the appropriate pressure as determined by the high pressure column pressure. As shown in FIG. 7, one option for compressing the LPAIR heat pump fluid is to feed it to an intermediate stage of main air compressor 4. In this particular embodiment, the MPAIR heat pump cycle provides additional reflux for the crude argon column, while the LPAIR heat pump cycle create additional reflux for the low pressure column.

Figure 8:
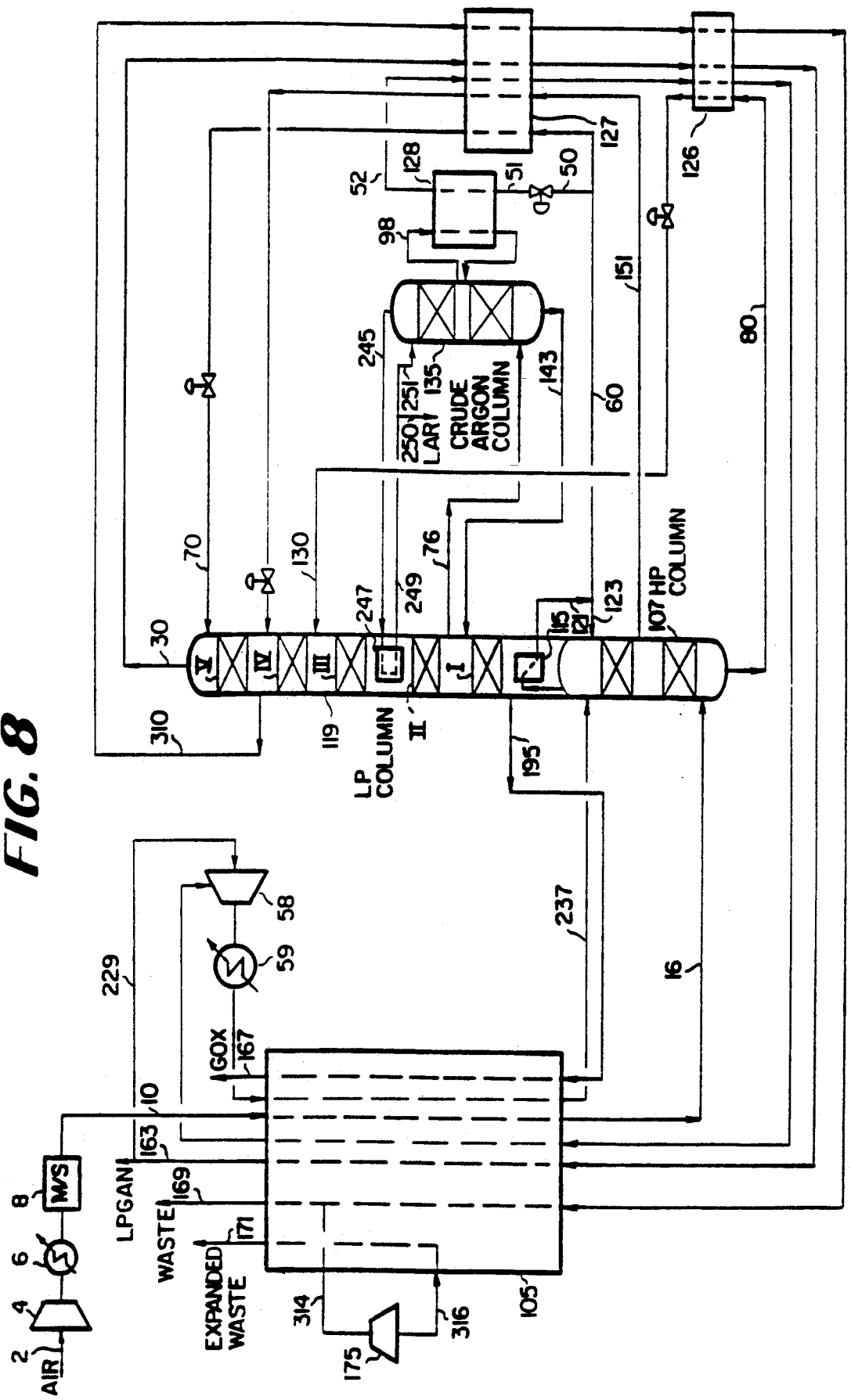
FIG. 8 is a schematic diagram of a variation to the first embodiment of the process of the present invention.

In all of the embodiments described above, one can slightly increase the pressure of the vaporizing heat pump stream in the first heat pump cycle (thereby saving on recompression requirements) by modifying the scheme so that the first cycle's heat pump fluid is vaporized by condensing a vapor stream from an *intermediate* location of the crude argon column. FIG. 8 illustrates this point using the combination MPGAN and LPGAN heat pump cycles. The process shown in FIG. 8 is identical to the process shown in FIG. 3 (similar features of the FIG. 8 process utilize common numbering with FIG. 3) except it incorporates this modification. Instead of vaporizing liquid nitrogen stream 50 against the crude argon column overhead stream 96 as shown in FIG. 3, a vapor stream 98 from a suitable intermediate point of the crude argon column is used. The intermediate stream will have a higher temperature than the overhead stream. As a result, a slightly higher pressure liquid nitrogen stream 51 can be vaporized. This modification is applicable to the MPGAN, MPAR and MPAIR heat pump cycles.

It should be noted that in all of the embodiments of the present invention described above, the crude argon column condenser is thermally linked to the low pressure column as suggested by U.S. Pat. No. 5,114,449. As discussed in this patent, this arrangement also helps to increase the argon recovery as compared to the conventional method represented by FIG. 1. The thermally-linked boiler/condenser for the crude argon column allows all of the crude liquid oxygen from the bottom of the high pressure column to be used as reflux for the low pressure column so that more argon can be concentrated to the bottom section of the low pressure column and drawn to the crude argon column. In addition, a more optimal location for generating vapor flow in the column allows for better separation and less pinching in the low pressure column. It should be indicated, however, that the thermal linking of the low pressure column with the crude argon column only complements and is not mandatory for the present invention. For example, the present invention is also compatible with the configuration shown in FIG. 1 wherein the crude argon overhead is condensed against the crude liquid oxygen from the bottom of the high pressure column. Essentially, the present invention can be used with any distillation configuration producing argon by air separation.

The refrigeration for the flowsheets shown in all of the embodiments of the present invention described above is provided by nearly isentropic expansion in an expander of at least a portion of the nitrogen-rich waste stream 310 from the low pressure column. Prior to expansion, the nitrogen-rich waste stream is partially warmed. This means of refrigeration is not an integral part of the invention and any suitable stream can be expanded to provide the needed refrigeration. Several methods of providing refrigeration are already known in the art and can be easily employed with the present invention.

Also, although not shown in any of the embodiments described above, the expansion of the waste stream to generate refrigeration can be integrated with the compression of the heat pump fluids for energy efficiency. A simple compander scheme can be set up where the expansion of the waste stream provides the mechanical work required to compress the heat pump fluids. Alternatively, the expansion of the waste stream can be used to generate power to fully or partially offset the power requirement of compressing the heat pump fluids.

In the embodiments described above, the low pressure column can be operated at a pressure significantly higher than atmospheric. However, even though the present invention will benefit from a higher operating pressure in the low pressure column, the present invention is definitely not limited by the low pressure column pressure. Conventionally, the double column air separation distillation columns are operated such that the pressure at the top of the low pressure column is within 2 to 6 psi of the atmospheric pressure. The proposed invention is applicable to the low pressure column pressure from near-atmospheric to 100 psi with the preferred range from near atmospheric to 50 psia. The maximum benefit of the present invention in increasing the argon recovery will be realized for those cases where the low pressure column pressure is higher. Another important benefit of the present invention is that while increasing argon recovery, it produces oxygen of greater purity. For example, it can produce oxygen of higher purity with less power than U.S. Pat. No. 4,615,716. This is because the method suggested by U.S. Pat. No. '716 only increases the boilup in the bottom section of the low pressure column, whereas the proposed methods not only provide this increased boilup but also provide an easy outlet for argon (which is the major impurity in oxygen) through the crude argon column.

The heat pump fluids in the embodiments discussed above are warmed in the heat exchangers prior to compression. Alternatively, the heat pump fluids may be compressed cold and sent to provide boilup at the bottom of the low pressure column. This will make the heat exchangers less complicated as the heat pump fluids need not be warmed prior to compression and then recooled after compression. However, the cold compression option can consume slightly more energy.

Figure 9:
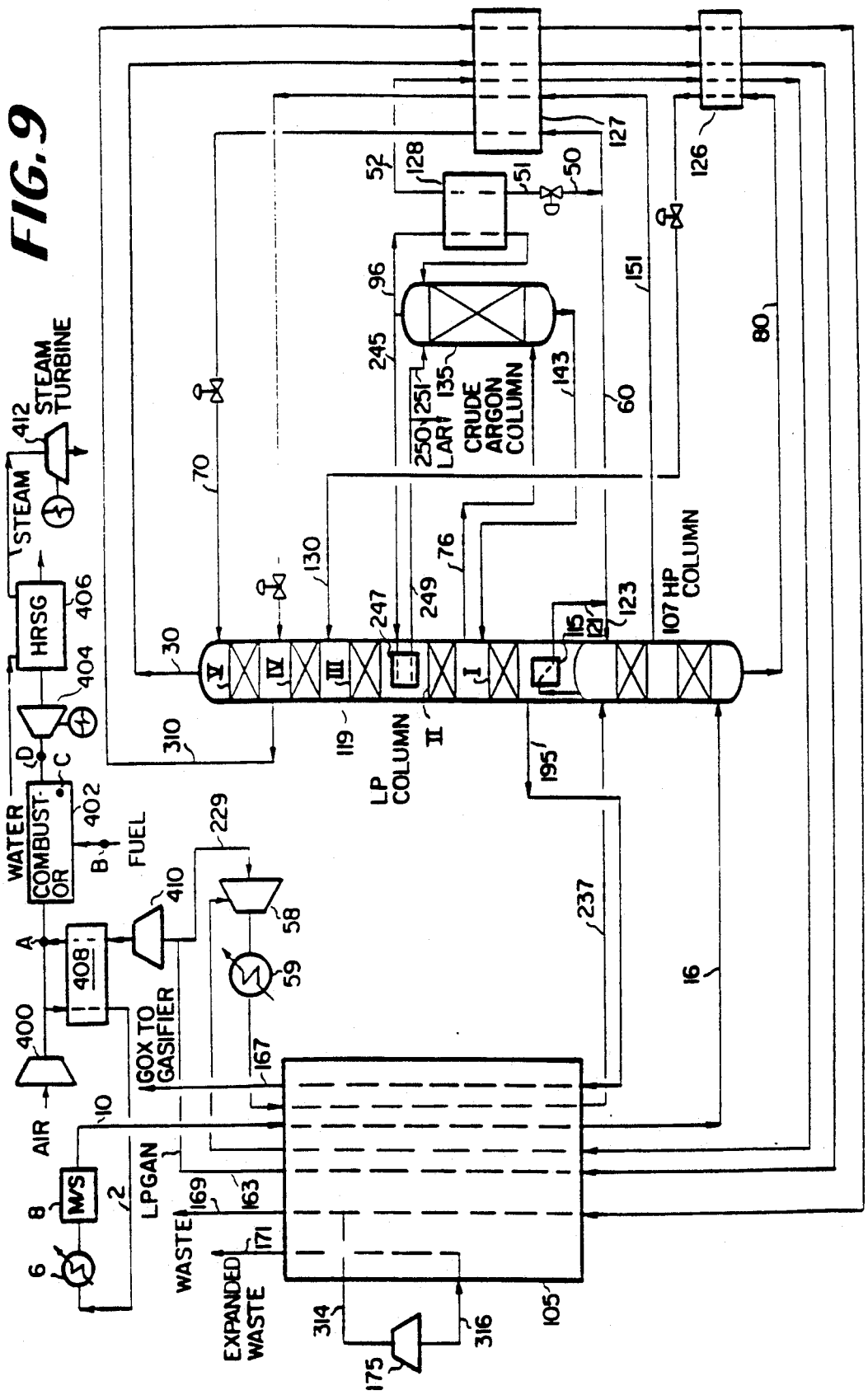
FIG. 9 is a schematic diagram of a sixth embodiment of the process of the present invention.

Finally, it is important to note that the present invention can be efficiently integrated with power generating turbine cycles such as the Coal Gasification Combined Cycle (CGCC) or direct reduction of iron ore processes. In these modes of integration, either all or a portion of feed air for the air separation plant may be withdrawn from the compressor portion of the gas turbine. This air is then cooled against any suitable medium by heat exchange and fed to the air separation unit. All or a portion of the nitrogen from the air separation unit may then be compressed and returned to a suitable location of the gas turbine. Gaseous oxygen is compressed and sent to a coal gasifier to generate fuel gas for the power generation. FIG. 9 shows FIG. 3's combination MPGAN and LPGAN heat pump cycles integrated with CGCC which CGCC comprises an air compressor 400, a combustor 402, an expander 404, a heat recovery steam generation (HRSG) unit 406, a heat exchanger 408, a nitrogen compressor 410 and a steam turbine 412. The process shown in FIG. 9 is identical to the process shown in FIG. 3 (similar features of the FIG. 9 process utilize common numbering with FIG. 3) except it incorporates the CGCC integration. In FIG. 9, all the feed air 2 to the air separation unit is withdrawn from air compressor 400 of the gas turbine and no supplementary compressor for the air supply is considered. Stream 2 to the air separation unit is cooled by heat exchange in heat exchanger 408 with the returning nitrogen stream 163 which has been compressed in compressor 410. If needed, it can be further cooled by heat exchange against water to make steam or preheat boiler feed water. The pressurized nitrogen stream is utilized by mixing with the air stream such as at point A as shown in FIG. 9 or point B to help reduce NOx emission by lowering the flame temperature in the combustor. Also, the required amount of steam sent to the combustor can be reduced. Other possible input locations for the pressurized nitrogen stream are points C and D. The return pressurized nitrogen stream acts as a quench stream to reduce the temperature of the gas entering the expander and provides additional gas volume for power generation.

In order to demonstrate the efficacy of the present invention, the following two examples are offered.

EXAMPLE 1

The purpose of this example is to demonstrate the improved argon recovery of the present invention (as embodied in FIG. 3) over the prior art (as embodied in FIG. 2). This was accomplished by performing two computer simulations for the process as depicted in the flowsheet of FIG. 3. In the first simulation, the MPGAN and LPGAN heat pump flows (streams 50 and 229 in FIG. 3) were set at zero, thus in effect simulating the process as depicted in the flowsheet of FIG. 2 (Recall that FIG. 2's flowsheet is the same as FIG. 3's flowsheet except that the MPGAN and LPGAN heat pump cycles and their corresponding recycle flows are absent). Operating conditions for selected streams in the first simulation are included in the following Table 1:

TABLE 1

| Stream Number | Temp. (°F.) | Pressure (psia) | Flow (lbmoles/hr) | Composition (mole %) | | |
|---|---|---|---|---|---|---|
| | | | | N2 | Ar | O2 |
| 10 | 45.0 | 152.0 | 100.00 | 78.12 | 0.93 | 20.95 |
| 16 | −254.4 | 150.0 | 100.00 | 78.12 | 0.93 | 20.95 |
| 30 | −303.0 | 40.3 | 64.30 | 99.98 | 0.02 | 0.00 |
| 60 | −272.8 | 145.7 | 33.50 | 100.00 | 0.00 | 0.00 |
| 76 | −275.7 | 45.5 | 35.00 | 0.01 | 8.22 | 91.78 |
| 195 | −274.8 | 46.0 | 20.90 | 0.00 | 0.45 | 99.55 |
| 245 | −281.2 | 44.0 | 36.70 | 0.15 | 99.65 | 0.20 |
| 250 | −281.3 | 44.0 | 0.76 | 0.15 | 99.65 | 0.20 |
| 310 | −302.1 | 41.5 | 13.20 | 99.25 | 0.52 | 0.23 |

In the second simulation, the LPGAN heat pump flow (stream 229 in FIG. 3) was set at 0.5% of the feed air flow while the MPGAN heat pump flow (stream 50 in FIG. 3) was set at 8.5% of the feed air flow. Operating conditions for selected streams in the second simulation are included in the following Table 2:

TABLE 2

| Stream Number | Temp. (°F.) | Pressure (psia) | Flow (lbmoles/hr) | Composition (mole %) | | |
|---|---|---|---|---|---|---|
| | | | | N2 | Ar | O2 |
| 10 | 45.0 | 152.0 | 100.00 | 78.12 | 0.93 | 20.95 |
| 16 | −253.1 | 150.0 | 100.00 | 78.12 | 0.93 | 20.95 |
| 30 | −302.9 | 40.5 | 64.80 | 99.99 | 0.01 | 0.00 |
| 50 | −272.8 | 145.7 | 8.50 | 100.00 | 0.00 | 0.00 |
| 52 | −283.3 | 98.0 | 8.50 | 100.00 | 0.00 | 0.00 |
| 60 | −272.8 | 145.7 | 42.50 | 100.00 | 0.00 | 0.00 |
| 76 | −275.6 | 45.5 | 40.00 | 0.01 | 7.64 | 92.36 |

TABLE 2-continued

| Stream Number | Temp. (°F.) | Pressure (psia) | Flow (lbmoles/hr) | Composition (mole %) | | |
|---|---|---|---|---|---|---|
| | | | | N2 | Ar | O2 |
| 96 | −281.3 | 44.0 | 6.00 | 0.16 | 99.64 | 0.20 |
| 195 | −274.8 | 46.0 | 20.90 | 0.00 | 0.17 | 99.83 |
| 229 | 43.2 | 38.4 | 0.50 | 99.99 | 0.01 | 0.00 |
| 237 | −272.8 | 145.7 | 9.00 | 100.00 | 0.00 | 0.00 |
| 250 | −281.3 | 44.0 | 0.83 | 0.16 | 99.64 | 0.20 |
| 310 | −302.1 | 41.7 | 13.20 | 99.31 | 0.45 | 0.24 |
| 314 | −120.6 | 39.9 | 13.20 | 99.31 | 0.45 | 0.24 |
| 316 | −182.0 | 17.2 | 13.20 | 99.31 | 0.45 | 0.24 |

To make the argon recovery comparisons between each simulation valid, the following variables were held constant in each simulation:
1) the feed air stream;
2) the product streams (other than the crude liquid argon product in stream 250);
3) the number of theoretical trays used in each column;
4) specifications for the high pressure column and the crude argon column (feed and product locations for the low pressure column were optimized for each simulation).

The following Table 3 shows the results of the two simulations. As noted above, the amount of heat pump flow is shown as a percent of the feed air flow in stream 16. Argon recovery is defined as the percentage of argon in feed air 16 which is recovered in crude argon product stream 250. Also included in the table is the additional KWH of power required for producing an additional ton of argon.

TABLE 3

| Simulation Number | MPGAN Heat Pump Flow | LPGAN Heat Pump Flow | Argon Recovery | Additional Power |
|---|---|---|---|---|
| 1 | 0 | 0 | 81.4% | 0 |
| 2 | 8.47 | 0.5% | 88.9% | 1614 |

Table 3 shows the significant increase in argon recovery achieved by the present invention as embodied in FIG. 3 (Simulation No. 2) over the prior art as embodied in FIG. 2 (Simulation No. 1).

EXAMPLE 2

The purpose of this example is to demonstrate that for a given target argon recovery, the process of the present invention as embodied in FIG. 3 is more efficient than a process which uses only the MPGAN heat pump of FIG. 3 or a process which uses only the LPGAN heat pump of FIG. 3. This was accomplished by performing three computer simulations for the process as depicted in the flowsheet of FIG. 3 wherein the target argon recovery for each simulation was set at 91.9%. In the first simulation, the heat pump flows (streams 50 and 229 in FIG. 3) for a 91.9% argon recovery rate were calculated to give the lowest additional KWH of power required for producing an additional ton of argon. In the second simulation, the heat pump flow for the LPGAN heat pump (stream 229 in FIG. 3) was set at zero and the heat pump flow for the MPGAN heat pump (stream 50 in FIG. 3) was calculated for a 91.9% argon recovery rate. In the third simulation, the heat pump flow for the MPGAN heat pump (stream 50 in FIG. 3) was set at zero and the recycle flow for the LPGAN heat pump (stream 229 in FIG. 3) was calculated for a 91.9% argon recovery rate. The following Table 4 shows the results of the three simulations:

TABLE 4

| Simulation Number | MPGAN Recycle | LPGAN Recycle | Argon Recovery | Additional Power |
|---|---|---|---|---|
| 1 | 13.9% | 2.0% | 91.9% | 2181 |
| 2 | 31.0% | 0 | 91.9% | 3381 |
| 3 | 0 | 9.2% | 91.9% | 3072 |

Table 4 demonstrates the effectiveness and the importance of the combination of heat pump cycles. In order to obtain the same 91.9% argon recovery while *only* using either the LPGAN or MPGAN heat pump, significantly higher compression power is needed. For the LPGAN case, a heat pump flow equivalent to about 9.2% of the feed air flow is required to achieve the 91.9% argon recovery. For the MPGAN case, a heat-pump flow equivalent to 31.0% of the feed air flow is needed. These cases, requiring over 3000 KWH per additional ton of argon produced, have about a 50% higher power requirement than the optimum combination of MPGAN and LPGAN heat pump cycles which require about 2180 KWH of power for producing an additional ton of argon.

As noted in regard to the first simulation in Example 2, the recycle flows in the MPGAN heat pump and LPGAN heat pump were calculated to give the lowest additional power required for an argon recovery of 91.9%. In other words, for a given argon recovery, there exists an optimum tradeoff between the amount of MPGAN heat pump flow and the amount of LPGAN heat pump flow. By properly selecting this optimum tradeoff, the lowest additional power for a given argon recovery can be achieved.

In summary, the present invention is an effective method for obtaining higher recoveries of argon in the air separation unit. They all increase the argon recovery by increasing the boilup in the bottom section of the low pressure column and also increasing the reflux to the low pressure and crude argon columns. The combination of heat pump fluids allows an optimal use of available compression power by permitting a tradeoff between the boilup needed at the bottom of the low pressure column and reflux needs of the low pressure and crude argon columns. Although the heat pumps have been presented for heat pumping the low pressure column, they can certainly be used to heat pump the crude argon column or even the high pressure column to improve separation. The selection of which of the heat pumps to use will, of course, depend on the cycle at hand. Factors such as the column operating pressures, the desired products, or whether the product compressors can be used to boost the recycle fluids must be taken into account to ensure an optimum flowsheet.

The present invention has been described in reference to specific embodiments thereof. These embodiments should not be viewed as limitations to the present invention, the scope of which should be ascertained by the following claims.

We claim:
1. In a cryogenic air distillation process producing argon from feed air using a multiple column distillation system comprising a high pressure column, a low pressure column and a crude argon column wherein the feed air is compressed in a main air compressor, cooled and at least a portion thereof is fed to the high pressure column; wherein in the high pressure column, the com- pressed, cooled feed air is rectified into a crude liquid oxygen bottoms and a high pressure nitrogen overhead; wherein the crude liquid oxygen is fed to the low pressure column; wherein in the low pressure column, the crude liquid oxygen is distilled into a liquid oxygen bottoms and a gaseous nitrogen overhead; wherein the low pressure column and the high pressure column are thermally linked such that a first portion of the high pressure nitrogen overhead is condensed in a reboiler/condenser against a first portion of vaporizing liquid oxygen bottoms; wherein an argon containing gaseous side stream is removed from a lower intermediate location of the low pressure column and fed to the crude argon column; and finally wherein in the crude argon column, the argon containing gaseous side stream is rectified into an argon-rich vapor overhead and an argon-lean bottoms liquid, and the argon-lean bottoms liquid is returned to the low pressure column; the improvement for increasing argon recovery comprising using a first heat pump cycle to transfer refrigeration from the bottom of the low pressure column to the top of the crude argon column and a second heat pump cycle to transfer refrigeration from the bottom of the low pressure column to the top of the low pressure column wherein the first heat pump cycle employs a heat pump fluid selected from the group consisting of nitrogen, argon, oxygen and mixtures thereof and wherein the second heat pump cycle also employs a heat pump fluid selected from the group consisting of nitrogen, argon, oxygen and mixtures thereof and wherein the first heat pump cycle is selected from the group consisting of an indirect reflux first heat pump cycle and a direct reflux first heat pump cycle and wherein the second heat pump cycle is selected from the group consisting of an indirect reflux second heat pump cycle and a direct reflux second heat pump cycle and finally wherein the indirect reflux first heat pump cycle comprises:

(a) condensing a first heat pump fluid by heat exchange against a second portion of vaporizing liquid oxygen bottoms;
(b) reducing the pressure of the first heat pump fluid;
(c) vaporizing the first heat pump fluid by heat exchange against at least a first portion of the argon-rich vapor overhead wherein an adequate temperature difference exists between the argon-rich vapor overhead and the vaporizing first heat pump fluid, thereby condensing said first portion of the argon-rich vapor overhead and returning at least a portion of the condensed argon to the top of the crude argon column to provide at least a first portion of liquid reflux for the crude argon column; and
(d) compressing the first heat pump fluid.

2. The process of claim 1 wherein the direct reflux first heat pump cycle comprises:
(a) condensing a first argon stream by heat exchange in the reboiler/condenser against a second portion of vaporizing liquid oxygen bottoms;
(b) reducing the pressure of the first argon stream;
(c) feeding the first argon stream to the top of the crude argon column to provide at least a first portion of liquid reflux for the crude argon column; and
(d) compressing a second argon stream.

3. The process of claim 2 wherein the indirect reflux second heat pump cycle comprises:

(i) condensing a second heat pump fluid by heat exchange against a third portion of vaporizing liquid oxygen bottoms;
(ii) reducing the pressure of the second heat pump fluid;
(iii) vaporizing the second heat pump fluid by heat exchange against at least a first portion of the gaseous nitrogen overhead wherein an adequate temperature difference exists between the gaseous nitrogen overhead and the vaporizing second heat pump fluid, thereby condensing said first portion of the gaseous nitrogen overhead and returning at least a portion of the condensed nitrogen to the top of the low pressure column to provide at least a portion of liquid reflux for the low pressure column; and
(iv) compressing the second heat pump fluid.

4. The process of claim 3 wherein the direct reflux second heat pump cycle comprises:
(i) condensing a first nitrogen stream by heat exchange in the reboiler/condenser against a third portion of vaporizing liquid oxygen bottoms;
(ii) reducing the pressure of the first nitrogen stream;
(iii) feeding the first nitrogen stream to the top of the low pressure column to provide at least a portion of liquid reflux for the low pressure column; and
(iv) compressing a second nitrogen stream.

5. The process of claim 4 wherein:
(A) the first heat pump cycle consists of the indirect reflux first heat pump cycle;
(B) the second heat pump cycle consists of the direct reflux second heat pump cycle;
(C) the first heat pump fluid consists of a second portion of the high pressure nitrogen overhead;
(D) the first nitrogen stream consists of a third portion of the high pressure nitrogen overhead;
(E) the second nitrogen stream consists of a first portion of the gaseous nitrogen overhead;
(F) the condensation of the first heat pump fluid in step (a) of the indirect reflux first heat pump cycle occurs in the reboiler/condenser; and
(G) the compression of the first heat pump fluid in step (d) of the indirect reflux first heat pump cycle and at least a portion of the compression of said first portion of the gaseous nitrogen overhead in step (iv) of the direct reflux second heat pump cycle are performed by the same compressor, the discharge of which compressor is recycled as feed to the top of the high pressure column prior to beginning a subsequent indirect reflux first heat pump cycle and a subsequent direct reflux second heat pump cycle.

6. The process of claim 4 wherein:
(A) the first heat pump cycle consists of the direct reflux first heat pump cycle;
(B) the second heat pump cycle consists of the direct reflux second heat pump cycle;
(C) the first argon stream consists of a first portion of the argon-rich vapor overhead;
(D) the second argon stream consists of a second portion of the argon-rich vapor overhead;
(E) the first nitrogen stream consists of a second portion of the high pressure nitrogen overhead;
(F) the second nitrogen stream consists of a first portion of the gaseous nitrogen overhead;
(G) subsequent to step (d) of the direct reflux first heat pump cycle, the second portion of the argon-rich vapor overhead is recycled as the first portion of the argon-rich vapor overhead in step (a) of a subsequent direct reflux first heat pump cycle; and (H) subsequent to step (iv) of the direct reflux second heat pump cycle, the first portion of the gaseous nitrogen overhead is recycled as feed to the top of the high pressure column prior to beginning a subsequent direct reflux second heat pump cycle.

7. The process of claim 4 wherein:

(A) the first heat pump cycle consists of the indirect reflux first heat pump cycle;

(B) the second heat pump cycle consists of the direct reflux second heat pump cycle;

(C) the first heat pump fluid consists of a portion of the compressed, cooled feed air;

(D) the first nitrogen stream consists of a second portion of the high pressure nitrogen overhead;

(E) the second nitrogen stream consists of a first portion of the gaseous nitrogen overhead;

(F) subsequent to step (c) of the indirect reflux first heat pump cycle, the first heat pump fluid is recycled to an intermediate stage of the main air compressor such that the compression of the first heat pump fluid in step (d) of the indirect reflux first heat pump cycle and the compression of the feed air are performed by the main air compressor, a portion of the discharge of which main air compressor is recycled as the portion of the compressed, cooled feed air in step (a) of a subsequent indirect reflux first heat pump cycle; and (G) subsequent to step (iv) of the direct reflux second heat pump cycle, the first portion of the gaseous nitrogen overhead is recycled as feed to the top of the high pressure column prior to beginning a subsequent direct reflux second heat pump cycle.

8. The process of claim 4 wherein;

(A) the first heat pump cycle consists of the direct reflux first heat pump cycle;

(B) the second heat pump cycle consists of the indirect reflux second heat pump cycle;

(C) the first argon stream consists of a first portion of the argon-rich vapor overhead;

(D) the second argon stream consists of a second portion of the argon-rich vapor overhead;

(E) the second heat pump fluid consists of a third portion of the argon-rich vapor overhead;

(F) the condensation of the second heat pump fluid in step (i) of the indirect reflux second heat pump cycle occurs in the reboiler/condenser; and (G) the compression of the second portion of the argon-rich overhead in step (d) of the direct reflux first heat pump cycle and at least a portion of the compression of the second heat pump fluid in step (iv) of the indirect reflux second heat pump cycle are performed by the same compressor, the discharge of which compressor is recycled as both the first portion of the argon-rich vapor overhead in step (a) of a subsequent direct reflux first heat pump cycle and the third portion of the argon-rich vapor overhead in step (i) of a subsequent indirect reflux second heat pump cycle.

9. The process of claim 4 wherein:

(A) the first heat pump cycle consists of the indirect reflux first heat pump cycle;

(B) the second heat pump cycle consists of the indirect reflux second heat pump cycle;

(C) the first heat pump fluid consists of a first portion of the compressed, cooled feed air;

(D) the second heat pump fluid consists of a second portion of the compressed, cooled feed air;

(E) the condensation of the second heat pump fluid in step (i) of the indirect reflux second heat pump cycle also occurs in the boiler/condenser; and (F) subsequent to step (c) of the indirect reflux first heat pump cycle and step (iii) of the indirect reflux second heat pump cycle, the respective heat pump fluids are recycled to the main air compressor such that the compression of the first heat pump fluid in step (d) of the indirect reflux first heat pump cycle, the compression of the second heat pump fluid in step (iv) of the indirect reflux second heat pump cycle and the compression of at least a portion of the feed air are all performed by the main air compressor, a portion of the discharge of which main air compressor is recycled as a both the first portion of the compressed, cooled feed air in step (a) of a subsequent indirect reflux first heat pump cycle and the second portion of the compressed, cooled feed air in step (i) of a subsequent indirect reflux second heat pump cycle.

10. The process of claim 4 which further comprises condensing a second portion of the argon-rich vapor overhead from the crude argon column by heat exchange in a boiler/condenser against at least a portion of liquid descending the low pressure column selected from a location of the low pressure column between the feed point of the crude liquid oxygen from the bottom of the high pressure column and the removal point for the argon containing gaseous side stream for the crude argon column wherein an adequate temperature difference exists between the descending liquid and the condensing argon, thereby at least partially vaporizing said liquid portion; and returning at least a portion of the condensed argon to the top of the crude argon column to provide a second portion of liquid reflux for the crude argon column.

11. In a power generating turbine cycle having a nitrogen feed demand and an oxygen feed demand and wherein an air feed is compressed, the process of claim 4 wherein at least a portion of the gaseous nitrogen overhead is used to satisfy the nitrogen feed demand and wherein at least a portion of vaporized liquid oxygen bottoms is used to satisfy the oxygen feed demand.

12. The process of claim 11 wherein the power generating turbine cycle is a coal gasification combined cycle.

13. The process of claim 11 wherein the compression of the air feed in the power generating turbine cycle and the compression of at least a portion of the feed air in the cryogenic air distillation process are performed by the same compressor.

14. The process of claim 11 wherein the compression of the air feed in the power generating turbine cycle and the compression of at least a portion of the feed air in the cryogenic air distillation process are performed independently.

* * * * *